(12) United States Patent
Heo

(10) Patent No.: US 11,662,988 B2
(45) Date of Patent: May 30, 2023

(54) COMPILER FOR RISC PROCESSOR HAVING SPECIALIZED REGISTERS

(71) Applicant: SHENZHEN GOODIX TECHNOLOGY CO., LTD., Shenzhen (CN)

(72) Inventor: Jaehoon Heo, San Diego, CA (US)

(73) Assignee: SHENZHEN GOODIX TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 17/037,487

(22) Filed: Sep. 29, 2020

(65) Prior Publication Data

US 2022/0100483 A1    Mar. 31, 2022

(51) Int. Cl.
*G06F 8/41* (2018.01)
*G06F 9/30* (2018.01)

(52) U.S. Cl.
CPC .......... *G06F 8/441* (2013.01); *G06F 9/30098* (2013.01)

(58) Field of Classification Search
CPC .. G06F 8/441; G06F 9/30098; G06F 8/41–49; G06F 9/30141
See application file for complete search history.

(56) References Cited

U.S. PATENT DOCUMENTS

| | | | | |
|---|---|---|---|---|
| 6,629,312 B1* | 9/2003 | Gupta | ................... | G06F 8/47 717/136 |
| 7,765,539 B1 | 7/2010 | Elliott et al. | | |
| 8,549,466 B2* | 10/2013 | Sule | ................... | G06F 8/441 717/104 |
| 9,009,692 B2* | 4/2015 | Kalogeropulos | ....... | G06F 8/441 717/152 |
| 2002/0042695 A1* | 4/2002 | Kamiya | ............. | G06F 9/30094 712/E9.019 |
| 2003/0237080 A1* | 12/2003 | Thompson | ............. | G06F 8/441 712/241 |
| 2006/0101369 A1* | 5/2006 | Wang | .................... | G06F 30/30 712/E9.028 |
| 2007/0022413 A1* | 1/2007 | Sule | ....................... | G06F 8/441 717/140 |
| 2009/0043620 A1* | 2/2009 | Lee | ....................... | G06F 9/3012 717/144 |

(Continued)

OTHER PUBLICATIONS

Lin, Yung-Chia, Yi-Ping You, and Jenq-Kuen Lee. "Register allocation for VLIW DSP processors with irregular register files." Proceedings of the 12th Workshop on Compilers for Parallel Computers (CPC 2006). 2006. (Year: 2006).*

(Continued)

*Primary Examiner* — Matthew J Brophy
(74) *Attorney, Agent, or Firm* — Kilpatrick Townsend & Stockton LLP

(57) ABSTRACT

A compiler is disclosed. The compiler is configured to generate executable code based on source code, where the source code includes a plurality of variables. The compiler includes an executable code generator configured to allocate a register to each of the source code variables, where the executable code generator is configured to select one of a group of register types to be allocated for each variable, and where the allocated register of each variable corresponds with the determined register type determined therefor.

20 Claims, 5 Drawing Sheets

(56) References Cited

U.S. PATENT DOCUMENTS

| | | | |
|---|---|---|---|
| 2009/0177876 A1* | 7/2009 | Wang | G06F 30/30 |
| | | | 713/1 |
| 2009/0249318 A1 | 10/2009 | Ayguade et al. | |
| 2011/0161945 A1* | 6/2011 | Kalogeropulos | G06F 8/441 |
| | | | 717/152 |
| 2013/0198495 A1* | 8/2013 | Vick | G06F 8/441 |
| | | | 712/226 |
| 2017/0358129 A1* | 12/2017 | Chen | G06T 15/80 |
| 2018/0365013 A1 | 12/2018 | Miyoshi | |
| 2019/0361802 A1 | 11/2019 | Li et al. | |

OTHER PUBLICATIONS

Lin, Yung-Chia, Yi-Ping You, and Jenq-Kuen Lee. "PALF: compiler supports for irregular register files in clustered VLIW DSPP processors." Concurrency and computation: practice and experience 19.18 (2007): 2391-2406. (Year: 2007).*

* cited by examiner

410 →

High Level Language Code

While (x > Y) { n = A + B;

x = x – n;

420 →

Intermediate Code n = A + B loop: x = x – n

_t = x < Y

If _t goto loop

430 →

Instruction Code add $R1, $C1, $C2 loop: sub $GP1, $GP1, $R1 slt $R2, $GP1, $C3 beq $R2, loop

Figure 4

COMPILER FOR RISC PROCESSOR HAVING SPECIALIZED REGISTERS

TECHNICAL FIELD

The subject matter described herein relates to a compiler for a RISC processor architecture, and more particularly to a compiler for a RISC processor architecture having specialized registers.

BACKGROUND

Compilers generate executable code based on high level language code. As part of generating the executable code, variables in the high level language are associated with registers, which are memory elements in the processor for executing the executable code. Within the processor, the registers are in register files which act as temporary memory storage locations for calculations performed by the processor to execute the executable code. The register files are used for storing various types of calculation variables, and are therefore each configured to be used for each type of calculation variable. Because each register file is capable of being used for each type of calculation variable, each register file is implemented in a memory circuit having all of the features needed for each of the calculation variables. Accordingly, each register file requires a certain amount of die area. Register files requiring less die area are needed in the art.

SUMMARY

One inventive aspect is a compiler configured to generate executable code based on source code, where the source code includes a plurality of variables. The compiler includes an executable code generator configured to allocate a register to each of the source code variables, where the executable code generator is configured to select one of a group of register types to be allocated for each variable, and where the allocated register of each variable corresponds with the determined register type determined therefor.

In some embodiments, the group of register types includes first registers of a first register file including a first number of read and write ports, and second registers of a second register file including a second number of read and write ports, where the first and second numbers of read and write ports are different.

In some embodiments, the executable code generator is configured to select the register type to be allocated for each variable by determining how many read and write ports the register allocated to each variable will need when executed.

In some embodiments, the executable code generator is configured to select the register type to be allocated for each variable by determining which of the register types accommodate execution time needs for each variable.

In some embodiments, the executable code generator is configured to receive intermediate code generated by the compiler, where selecting the register type to be allocated for each variable includes determining how the variable is used in the intermediate code.

In some embodiments, the executable code generator is configured to select the register type to be allocated for each variable by determining which of the register types accommodate execution time needs for each variable.

In some embodiments, the executable code generator is configured to select the register type to be allocated for a particular variable by determining that more than one register type accommodates the execution time needs of the particular variable.

In some embodiments, the executable code generator is configured to select the register type to be allocated for a particular variable by selecting one of the register types that accommodate the execution time needs of the particular variable based on the selected register type requiring less power to operate than other register types that accommodate the execution time needs of the particular variable.

In some embodiments, the executable code generator is configured to select the register type to be allocated for a particular variable by selecting one of the register types that accommodate the execution time needs of the particular variable based on preserving an unused state of a register file having registers of one of the register types that accommodate the execution time needs of the particular variable.

In some embodiments, the executable code generator is further configured to allocate registers of a first register type to variables determined for the first register type as a first register allocation problem, and to allocate registers of a second register type to variables determined for the second register type as a second register allocation problem.

Another inventive aspect is a method of using a compiler to generate executable code based on source code, where the source code includes a plurality of variables. The method includes, with an executable code generator, selecting one of a group of register types to be allocated for each variable, and, with the executable code generator, allocating a register to each of the source code variables, where the allocated register of each variable corresponds with the determined register type determined therefor.

In some embodiments, the group of register types includes first registers of a first register file including a first number of read and write ports, and second registers of a second register file including a second number of read and write ports, where the first and second numbers of read and write ports are different.

In some embodiments, selecting the register type to be allocated for each variable includes determining how many read and write ports the register allocated to each variable will need when executed.

In some embodiments, selecting the register type to be allocated for each variable includes determining which of the register types accommodate execution time needs for each variable.

In some embodiments, the method further includes, with the executable code generator, receiving intermediate code generated by the compiler, where selecting the register type to be allocated for each variable includes determining how the variable is used in the intermediate code.

In some embodiments, selecting the register type to be allocated for each variable includes determining which of the register types accommodate execution time needs for each variable.

In some embodiments, selecting the register type to be allocated for a particular variable includes determining that more than one register type accommodates the execution time needs of the particular variable.

In some embodiments, selecting the register type to be allocated for a particular variable includes selecting one of the register types that accommodate the execution time needs of the particular variable based on the selected register type requiring less power to operate than other register types that accommodate the execution time needs of the particular variable.

In some embodiments, selecting the register type to be allocated for a particular variable includes selecting one of the register types that accommodate the execution time needs of the particular variable based on preserving an unused state of a register file having registers of one of the register types that accommodate the execution time needs of the particular variable.

In some embodiments, the method further includes, with the executable code generator, allocating allocate registers of a first register type to variables determined for the first register type as a first register allocation problem, and allocating registers of a second register type to variables determined for the second register type as a second register allocation problem.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations.

FIG. 4 illustrates an example of executable code generated based on high level language code.

When practical, similar reference numbers denote similar structures, features, or elements.

DETAILED DESCRIPTION

Figure 1:
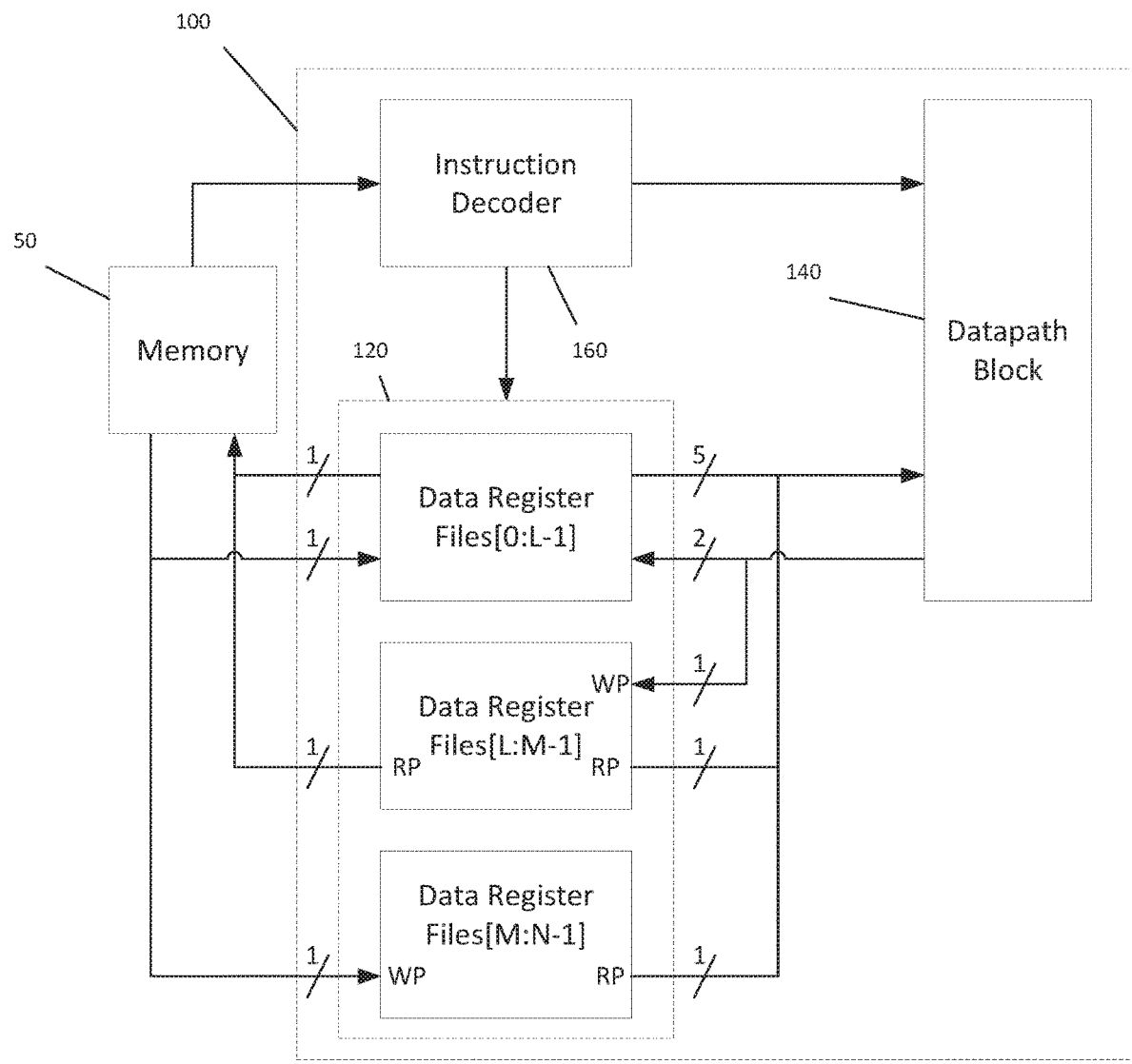
FIG. 1 is a schematic diagram of an embodiment of a processor circuit.

Particular embodiments of the invention are illustrated herein in conjunction with the drawings. Particular embodiments of the invention are illustrated herein in conjunction with the drawings.

Various details are set forth herein as they relate to certain embodiments. However, the invention can also be implemented in ways which are different from those described herein. Modifications can be made to the discussed embodiments by those skilled in the art without departing from the invention. Therefore, the invention is not limited to particular embodiments disclosed herein.

Processor register files interface with data path circuits according to the number of read and write ports the register files have. Embodiments discussed herein disclose a data path circuit which interfaces with specialized register files having specialized numbers of read and write ports.

Processors, such as RISC processors, use a LOAD/CALCULATE/STORE procedure for processing instructions, where data is LOADED into one or more registers, a CALCULATION is performed on the register data using a data path block of a datapath having multiple data path blocks, and calculation results from the data path block are STORED in one or more registers. Read and write access is provided to each register by read and write ports for both the memory and the data path blocks of the datapath. For an implementation, designers determine the number of registers and register files based on trade-offs between, for example, execution speed and circuit die area. In addition, designers determine a number of read and write ports for both the memory and the datapath to be used for the register files. Each register file requires a certain amount of circuit die area and a certain amount of power.

In some embodiments, some register files may be used as general purpose register files, which have a designed number of each port type. In addition, result variable register files may have two read ports and one write port, and constant variable register files may have one port and one write port. In some embodiments, other register files having other port configurations may be used. Because the result variable and constant variable registers use fewer ports, they use less area and less power. Therefore, using these specialized registers in the place of a number of general purpose registers uses less circuit die area and less power for the same number of registers.

Embodiments of data path circuits disclosed herein allow for specialized data path circuits to interface with the specialized register. Embodiments of register files disclosed herein include general purpose register files, that have a determined number of read and write ports for the memory and the datapath, and also have specialized registers, that use a different number of ports according to how each of the registers is to be used.

A compiler for generating executable code based on source code, where the executable code is executable on a processor having multiple types of register files is discussed. Functionality of a particular processor circuit having data register files, an instruction decoder, and a data path block is discussed with reference to FIG. 1.

FIG. 1 is a schematic diagram of an embodiment of a processor circuit 100 interfacing with memory 50. Processor circuit 100 includes data register files circuit 120, data path block circuit 140, and instruction decoder circuit 160. Methods of compiling the source code are discussed with reference to FIGS. 2 and 3. An example of source code, intermediate code, and executable code is discussed with reference to FIG. 4. A configuration for a computer system constructed in accordance with the present disclosure is discussed with reference to FIG. 5.

Processor circuit 100 may be used as a portion of a central processing unit (CPU) having other processor circuits known to those of skill in the art. In some embodiments, processor circuits having features other than those specifically discussed herein with reference to processor circuit 100 may be used.

As illustrated, in this embodiment, each of the data register files of data register files circuit 120 includes one of:

five read ports and two write ports for interfacing with data path block circuit 140, and one read port and one write port for interfacing with memory 50;

one read port and one write port for interfacing with data path block circuit 140, and one read port for interfacing with memory 50; and one read port for interfacing with data path block circuit 140, and one write port for interfacing with memory 50.

The registers of data register files having five read ports and two write ports for interfacing with data path block circuit 140, and one read port and one write port for interfacing with memory 50 may, for example, be used as general purpose registers.

The registers of data register files having one read port and one write port for interfacing with data path block circuit 140, and one read port for interfacing with memory 50, may, for example be used as result registers, which store results of calculations operations, where the results may be stored in memory 50.

The registers of data register files having one read port for interfacing with data path block circuit 140, and one write port for interfacing with memory 50, may, for example, be used as constant registers, which store constants, which do not change for a number of data path instructions. For example, a group of data path instructions may be associated with a loop in the source code compiled to generate the data path instructions, and constant registers may be used to store values of constants which do not change during the execution of the data path instructions associated with the loop.

In other embodiments, register files having other numbers of ports interfacing with data path block circuit 140 may be used. In other embodiments, register files having other numbers of ports interfacing with memory 50 may be used.

For example, in some embodiments, one or more register files has one read port and one write port for interfacing with data path block circuit 140, and one write port for interfacing with memory. The registers of these register files may be used for variables, for example, which are initialized prior to the execution of a loop, and which are used and modified within the loop, and not used in other code. These registers may be allocated to other variables when their port configuration is suitable for the other variables.

In some embodiments, one or more register files has one write port for interfacing with data path block circuit 140, and one read port for interfacing with memory 50. The registers of these register files may be used for variables, for example, which are created in a loop and which are subsequently used in other code. These registers may be allocated to other variables when their port configuration is suitable for the other variables.

Memory circuit 50 may be any memory structure, as understood by those of skill in the art. Memory circuit 50 stores at least processing instructions and data. After an instruction and data are received by processor circuit 100, the processor circuit 100 performs operations using the read data based on the read instruction.

Instruction decoder circuit 160 is configured to receive data path instructions from memory circuit 50, where the data path instructions cause data path block circuit 140 to generate a result which is stored in data register files circuit 120. Each data path instruction encodes at least a data path operation to be performed, a result register within data register files circuit 120 where the result of the data path operation is to be stored, and one or more operand registers within data register files circuit 120 which store data to be used as operands for the data path operation. As understood by those of skill in the art, for some data path instructions, the result register where the result of the data path operation is to be stored is the same as an operand register storing data to be used as an operand for the data path operation.

Based on the received data path instructions from memory circuit 50, instruction decoder circuit 160 is configured to generate register signals for data register files circuit 120 which encode the one or more result registers within which one or more results of one or more data path operations are to be stored, a write port for each result register to be used for writing the one or more results of the one or more data path operations to the one or more result registers, the one or more operand registers within data register files circuit 120 which store the data to be used as operands for the one or more data path operations, and a read port for each operand register to be used for reading the operand data therefrom.

In addition, based on the received data path instructions from memory circuit 50, instruction decoder circuit 160 is configured to generate operation signals for data path block circuit 140 which encode the one or more operations to be performed, the write port for each result register to be used for writing the one or more results of the one or more data path operations to the one or more result registers, and the read port for each operand register to be used for reading the operand data therefrom.

Data register files circuit 120 is configured to receive the register signals from instruction decoder circuit 160 which encode the one or more result registers, the write port for each result register to be used for writing the one or more results of the one or more data path operations to the one or more result registers, the one or more operand registers, and the read port for each operand register to be used for reading the operand data therefrom.

Based on the received register signals from instruction decoder circuit 160 which encode the one or more registers which store the data to be used as operands for the one or more data path operations, the data register files circuit 120 generates operand data signals for data path block circuit 140. For example, the register signals may identify a particular register file and a particular register within the particular register file for each of the one or more registers storing data to be used as operands for the one or more data path operations. In response to the register signals, the data from the identified particular registers is read and provided to data path block circuit 140 as the operand data signals.

Based on the received register signals from instruction decoder circuit 160 which identify the read port for each operand register to be used for reading the operand data therefrom, the data register files circuit 120 reads the data from the identified particular registers and provides the data read to the read ports identified in the received register signals.

Data path block 140 is configured to receive the operation signals from instruction decoder circuit 160 which encode the one or more data path operations to be performed. In addition, data path block 140 is configured to receive the operation signals from instruction decoder circuit 160 which identify the read port for each operand data signal to be used for reading the operand data.

Based on the received operation signals, data path block 140 accesses the identified read ports of data register files circuit 120 to receive the operand data signals which encode the data to be used as operands for the one or more data path operations.

Data path block 140 comprises a number of logic circuits, each configured to receive a particular number of operands. Each of the logic circuits is also configured to perform a particular data path operation to generate one or more results based on the received operand data signals. For example, data path block 140 may comprise one or more of each of the following logic circuits: shifters, adders, and multipliers. As understood by those of skill in the art, data path block 140 may additionally comprise one or more of each of a number of other logic circuits.

Based on the received operation signals, which encode the one or more data path operations to be performed, data path block 140 selects one or more of the logic circuits. As a result of the selection, the selected logic circuits receive the operand data signals which encode the data to be used as operands for the one or more data path operations.

In response to the operand data signals, the selected logic circuits generate one or more results according to the logic circuitry of the selected logic circuits, as understood by those of skill in the art.

The generated one or more results are provided to data register files circuit 120.

In some embodiments, data path block 140 comprises a number of separate data paths, where each data path comprises a number of each of: shifters, adders, multipliers, and other data path logic circuits. In these embodiments, each data path is used to simultaneously calculate separate results. Accordingly, in these embodiments, the operation signals received by data path block 140 from instruction decoder circuit 160 encode one or more data path operations to be performed with one or more of the separate data paths. In addition, the operand data signals received by data path block 140 from data register files circuit 120 encode the data to be used as operands for the one or more data path operations to be performed with the one or more separate data paths.

Based on the received operation signals from instruction decoder circuit 160 which identify the write port for each result register to be used for writing the one or more results to the one or more result registers of data register files circuit 120, data path block circuit 140 provides the one or more results to the identified one or more write ports of data register files circuit 120.

The one or more results provided to the identified write ports of data register files circuit 120 are written to specified registers within the data register files circuit 120 based on the register signals from instruction decoder 160 which identify the one or more result registers within which the one or more results are to be stored, and the write port for each result register to be used for the writing.

In some embodiments, the instruction decoder circuit 160 decodes the one or more data path instructions, the data path block circuit 140 receives the operand data signals from data register files circuit 120 and provides the one or more results to data register files circuit 120, and the one or more results are written to data register files circuit 120 in a single CPU clock cycle. In response to an indication of a new clock cycle, the instruction decoder circuit 160 decodes the one or more data path instructions. In addition, the data path block circuit 140 receives the operation signals from instruction decoder 160, receives the operand data signals from data register files circuit 120, calculates the one or more results, and provides the one or more results to data register files circuit 120, which stores the one or more results in the one or more registers specified in the one or more data path instructions received by instruction decoder circuit 160.

Instruction decoder circuit 160 is also configured to receive memory instructions from memory circuit 50, where the memory instructions cause either data to be read from register files circuit 120 to memory circuit 50 or to be written to register files circuit 120 from memory circuit 50. Each memory instruction encodes at least a memory operation (read from register files circuit 120 or write to register files circuit 120) to be performed, a register within data register files circuit 120 which is read or written, and an address in memory 50.

Based on the received memory instructions from memory circuit 50, instruction decoder circuit 160 is configured to generate register signals for data register files circuit 120 which encode the memory instructions.

Data register files circuit 120 is configured to receive the register signals from instruction decoder circuit 160. Based on the received register signals from instruction decoder circuit 160, the data register files circuit 120 interacts with the memory circuit according to the memory instruction, for example, by reading data from a specified register and writing the read data to memory 50 at a specified address, or by reading data from a specified address in memory 50 and writing the read data to a specified register.

Figure 2:
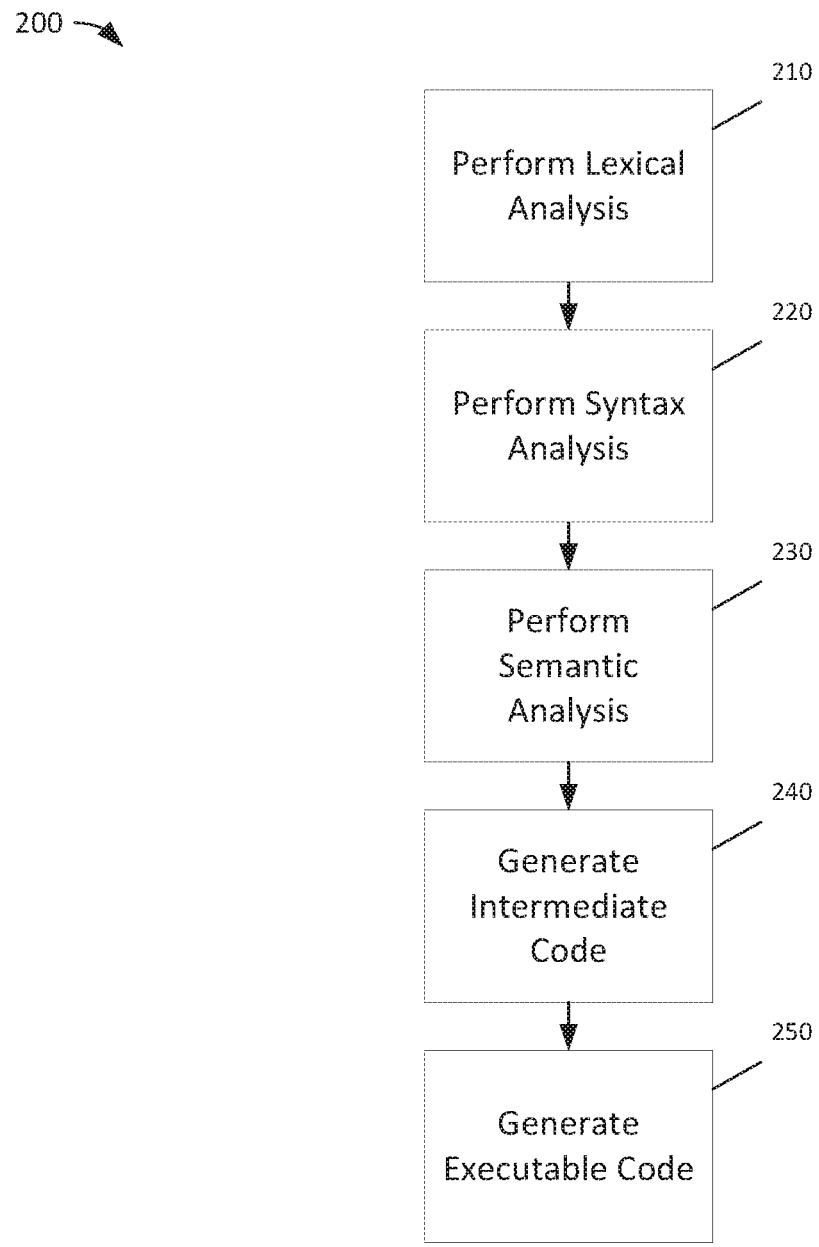
FIG. 2 is a flowchart diagram illustrating a method of generating executable code based on high level language code.

FIG. 2 is a flowchart diagram illustrating a method 200 of generating executable code based on high level language code, where the generated executable code includes instructions which may be executed by a processor comprising a processor circuit, such as processor circuit 100 of FIG. 1. To execute the executable code, the instructions of the executable code are stored in a memory, such as memory 50 of FIG. 1, and provided, as needed, to an instruction decoder, such as instruction decoder 160 of FIG. 1.

Method 200 may be performed, for example, by a compiler, which translates the high level language code or source code to the executable code. Method 200 illustrates various particular compiler aspects, features, procedures, as an example only. Inventive aspects discussed herein may be practiced using other methods of compiling or generating executable code based on high level language code.

At 210, a lexical analysis is performed. For example, the high level language code, or source code may be scanned as a set of characters and converted it into lexemes, where each lexemes corresponds with a meaningful code unit, using for example, a lexer. In some embodiments, a Lexer comprises one or more of a tokenizer and a scanner, which generate tokens corresponding with the lexemes. Any of a number of lexers known to those of skill in the art may be used.

At 220, a syntax analysis is performed. For example, a syntax analyzer may receive the tokens from the lexer, and generate a parse tree or syntax tree based on the tokens. Any of a number of syntax analyzers known to those of skill in the art may be used.

At 230, a semantic analysis is performed. For example, a semantics analyzer may receive a representation of the parse tree or syntax tree and analyze the parse tree or syntax tree for semantic errors. For example, the semantics analyzer may search for errors related to process flow, label usages and references, and variable data type usage. Any of a number of semantics analyzers known to those of skill in the art may be used.

At 240, intermediate code is generated with an intermediate code generation module. The intermediate code may be a mid-level language code. For example, the intermediate code may encode the same functionality as the high level language code, but may be less human readable than the executable code. As compared with the high level language code, the intermediate code may be more suitable for instruction selection and for register allocation. Any of a number of techniques known to those of skill in the art may be used to generate the intermediate code.

At 250, executable code is generated. Various steps known to those of skill in the art are used to generate the executable code. For example, executable code generation may include instruction selection, register allocation, and any of a number of other processes. An embodiment of a method of allocating registers is discussed below with reference to FIG. 3.

Figure 3:
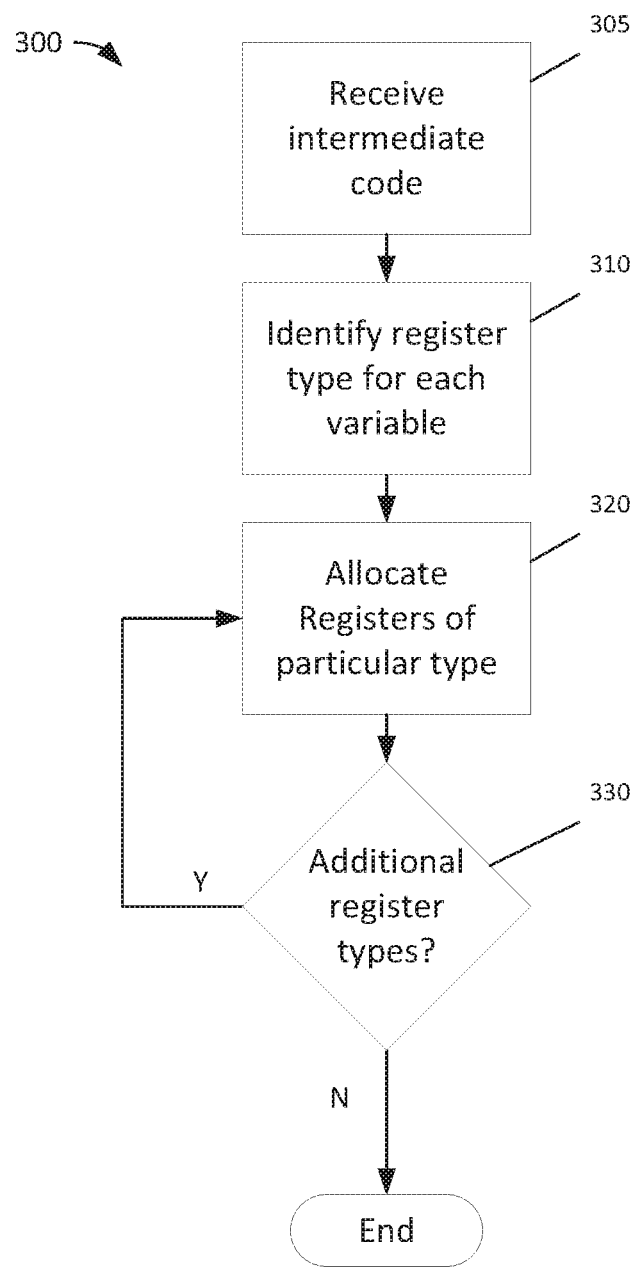
FIG. 3 is a flowchart diagram illustrating a method of allocating registers as part of the method of FIG. 2.

FIG. 3 is a flowchart diagram illustrating a method 300 of allocating registers, for example, as part of a method of generating FIG. 2.

Method 300 may be performed, for example, by a compiler, which translates the high level language code or source code to the executable code. Method 300 illustrates an embodiment of a register allocation process which allocates registers for executable code to be executed with a processor having different types of registers, such as a processor having an embodiment of processor circuit 100 of FIG. 1.

A 305, a register allocation module receives intermediate code generated based on source code. The intermediate code may, for example, be generated using processes discussed above with reference to the method 200 of FIG. 2.

At 310, the register allocation module analyzes the intermediate code to identify a type of register for each variable of the intermediate code. For example, the occurrences of each variable may analyzed to determine how the variable is used to identify which of a number of register types to use for the variable. For example, the processor may have three types of register files, where each type of register file is characterized, for example, by the number of read and write ports it has for each of a memory circuit and a data path block circuit of the processor.

For example, a number of general purpose registers may be grouped in one or more general purpose register files, where each general purpose register file has five read ports and two write ports for interfacing with the data path block circuit, and has one read port and one write port for interfacing with the memory circuit.

In addition, a number of result registers may be grouped in one or more result register files, where each result register file has one read port and one write port for interfacing with the data path block circuit, and has one read port for interfacing with the memory circuit.

Furthermore, a number of constant registers may be grouped in one or more constant register files, where each constant register file has one read port for interfacing with the data path block circuit, and has one write port for interfacing with the memory circuit.

In some embodiments, a number of other registers may be grouped in one or more other register files. The other register files may be used instead of or in addition to the general purpose register files, the result register files, and the constant register files.

For example, in some embodiments, a number of other registers are grouped in one or more other register files, each having one read port and one write port for interfacing with the data path block circuit, and having one write port for interfacing with the memory circuit.

In some embodiments, a number of other registers are grouped in one or more other register files, each having one write port for interfacing with the data path block circuit, and having one read port for interfacing with the memory circuit.

To determine which type of register is to be allocated to a particular variable, the register allocation module may analyze the usage of the particular variable. In some embodiments, the register allocation module determines which type of register is to be allocated to a particular variable based on the usage of the particular variable within a programming loop. For example, the register allocation module may determine which types of registers accommodate the execution time needs of each variable, based, for example, on the port configuration of the register file thereof.

For example, one of a number constant registers in a constant register file may be allocated to a variable which is used as a constant in the context of a programming loop.

In some embodiments, a number constant registers in a constant register file may be allocated to variables which are not used as a constant in the context of the programming loop. For example, a constant register in a constant register file may be allocated to a variable having a use other than a constant in the context of the programming loop, but which, during execution, will only need one read port for interfacing with the data path block circuit, and one write port for interfacing with the memory circuit.

In addition, one of a number result registers in a result register file may be allocated to a variable which is used as a result in the context of a programming loop.

In some embodiments, one of a number result registers in a result register file may be allocated to variables which are not used as a result in the context of the programming loop. For example, a result register in a result register file may be allocated to a variable having a use other than a result in the context of the programming loop, but which, during execution, will only need one read port and one write port for interfacing with the data path block circuit, and one read port for interfacing with the memory circuit.

In addition, one of a number general purpose registers in a general purpose register file may be allocated to a variable which is used as neither a result nor a constant in the context of a programming loop.

In some embodiments, one of a number result registers in a result register file may be allocated to variables which are used as either a result or a constant in the context of the programming loop. For example, a general purpose register in a general purpose register file may be allocated to a variable having a use other than as either a result or a constant in the context of the programming loop, but which, during execution, will need one or more read ports and one or more write port for interfacing with the data path block circuit, and one read port and one write port for interfacing with the memory circuit.

In some embodiments, registers having fewer ports are preferentially allocated to variables. For example, a result register file may be preferentially allocated to a variable which would execute properly if either a general purpose register or a result register were allocated thereto. Similarly, a constant register file may be preferentially allocated to a variable which would execute properly if either a result register or a constant register were allocated thereto. Furthermore, a constant register file may be preferentially allocated to a variable which would execute properly if either a general purpose register or a constant register were allocated thereto.

Preferential register allocation based on number of ports is advantageous at least because the registers in register files having fewer ports use less power during execution. This preferential allocation is also advantageous at least because the registers in register files having fewer ports have less utility, so that the registers of more utility remain available for another variable, which may need the greater utility.

In alternative embodiments, if a particular register file may be avoided, the registers of the particular register file may be selectively allocated to no variables. For example, if general purpose registers and constant registers may be allocated to variables, the register allocation module may selectively allocate one or more of the result register files to no variables to preserve their unused state. This allocation may occur despite variables execution time needs being satisfied by at least one of the unselected register file types. Similarly, if general purpose registers may be allocated to variables, the register allocation module may selectively allocate one or more of the result register files or the constant register files to no variables to preserve their unused state. This allocation may occur despite variables execution time needs being satisfied by at least one of the unselected register file types. This type of allocation may be advantageous at least because if no registers of a particular register file are allocated to variables, that register file not being used may save power. This type of allocation may be advantageous at least because if no registers of a particular register file are allocated to variables, that register file may be powered down to save power.

In alternative embodiments, the source code includes indications of which type of register is to be assigned to each variable. For example, the text of each variable may encode the register type to be assigned thereto.

At 320, the registers of a particular register type are allocated to variables to be allocated to the particular register type. The registers are allocated using a register allocation method know to those of skill in the art. Any method may be used for allocating the registers of the particular register type to variables for the particular register type.

At 330, if one or more other particular register types are to be allocated to variables, the method 300 returns to 320. Otherwise, registers are allocated to all variables, and the method 300 ends.

An advantageous aspect of method 300 is that the register allocation problem may be divided into multiple smaller register allocation problems. For example, in some embodiments, the large register allocation problem of allocating registers to all of the intermediate code variables is split into multiple smaller register allocation problems, where each smaller register allocation problem allocates registers of a single register type to variables to be allocated to the single register type. Because register allocation is frequently an NP complete problem, dividing the larger NP complete problem into smaller NP complete problems decreases processor resources needed to compute the solution to the NP complete problem, as understood by those of skill in the art. For example, runtime and power consumption are decreased.

FIG. 4 illustrates an example of source code (high level language code), and intermediate code and executable code (instruction code) generated by a compiler using the methods of FIGS. 2 and 3.

The high level language code 410 includes a while loop, which executes as long as the variable x, which is changed in the loop is greater than Y, a constant. Within the loop, the variable n is set to be equal to the sum of A, a constant and B, a constant. In addition, within the loop, variable x is reduced by n.

The intermediate code 420 encodes the same while loop as the high level language code 410. As shown, intermediate code 420 has a loop, but the assignment of variable n to the value A+B is not within the loop. In addition, new variable t has been assigned the value of the loop condition (x<Y), and branching to the loop is conditioned with the value of t.

The instruction code 430 encodes the same while loop as the high level language code 410 and the intermediate code 420.

The "n=A+B" code of the intermediate code 420 has been translated to "add $R1, $C1, $C2," where "add" represents the addition operation of the instruction, "$R1" identifies a register for the result of the add operation, "$C1" identifies a register for the first operand of the add operation, and "$C2" identifies a register for the second operand of the add operation.

Because the n variable is a result of an operation, a result register $R1 is allocated to the n variable. For example, because the register to be allocated to the n variable needs both a read port and a write port for interfacing with the datapath block circuit, either of a result register and a general purpose register could be allocated to the n variable, as described above. In addition, because result registers have fewer ports and/or use less power, the result register $R1 instead of a general purpose register is allocated to the n variable.

Because the A variable is a constant within the loop, a constant variable $C1 is allocated to the A variable. For example, because the register for the A variable needs to be writable from the memory and readable by the datapath, either of a constant register and a general purpose register could be allocated to the A variable, as described above. In addition, because constant registers have fewer ports and/or use less power than the general purpose registers, the constant register $C1 instead of a general purpose register is allocated to the A variable.

Because the B variable is a constant within the loop, a constant variable $C2 is allocated to the B variable. For example, because the register for the B variable needs to be writable from the memory and readable by the datapath, either of a constant register and a general purpose register could be allocated to the B variable, as described above. In addition, because constant registers have fewer ports and/or use less power than the general purpose registers, the constant register $C2 instead of a general purpose register is allocated to the B variable.

The "loop: x=x−n" code of the intermediate code 420 has been translated to "loop: sub $GP1, $GP1, $R1," where "sub" represents the subtraction operation of the instruction, "$GP1" identifies a register for the result of the sub operation, "$GP1" identifies a register for the first operand of the sub operation, and "$R1" identifies a register for the second operand of the add operation.

Because the x variable is defined prior to the loop execution and is used after the loop operation, a general purpose register $GP1 is allocated to the x variable. For example, because the register for the x variable needs both a read port and a write port for interfacing with the datapath block circuit and needs both a read port and a write port for interfacing with the memory, only a general purpose register can be allocated to the x variable, as described above. Accordingly, the general purpose register $GP1 is allocated to the variable n.

The "_t=x<Y" code of the intermediate code 420 has been translated to "slt $R2, $GP1, $C3," where "slt" represents a set if less than operation of the instruction, "$R2" identifies a register for the result of the slt operation, "$GP1" identifies a register for the first operand of the slt operation, and "$C3" identifies a register for the second operand of the add operation.

Because the _t variable is a result of an operation, a result register $R2 is allocated to the _t variable. For example, because the register for the _t variable needs both a read port and a write port for interfacing with the datapath block circuit, either of a result register and a general purpose register could be allocated to the _t variable, as described above. In addition, because result registers have fewer ports and/or use less power, the result register $R2 instead of a general purpose register is allocated to the variable t.

Because the Y variable is a constant within the loop, a result constant $C3 is allocated to the Y variable. For example, because the register for the Y variable needs to be writable from the memory and readable by the datapath, either of a constant register and a general purpose register could be allocated to the Y variable, as described above. In addition, because constant registers have fewer ports and/or use less power than the general purpose registers, the constant register $C3 instead of a general purpose register is allocated to the Y variable.

The "If _t goto loop" code of the intermediate code 420 has been translated to "beq $R2, loop," where "beq" represents a branch if equal operation of the instruction, "$R2"

identifies a register for the test condition of the beq operation, and "loop" identifies an instruction label to branch to.

Figure 5:
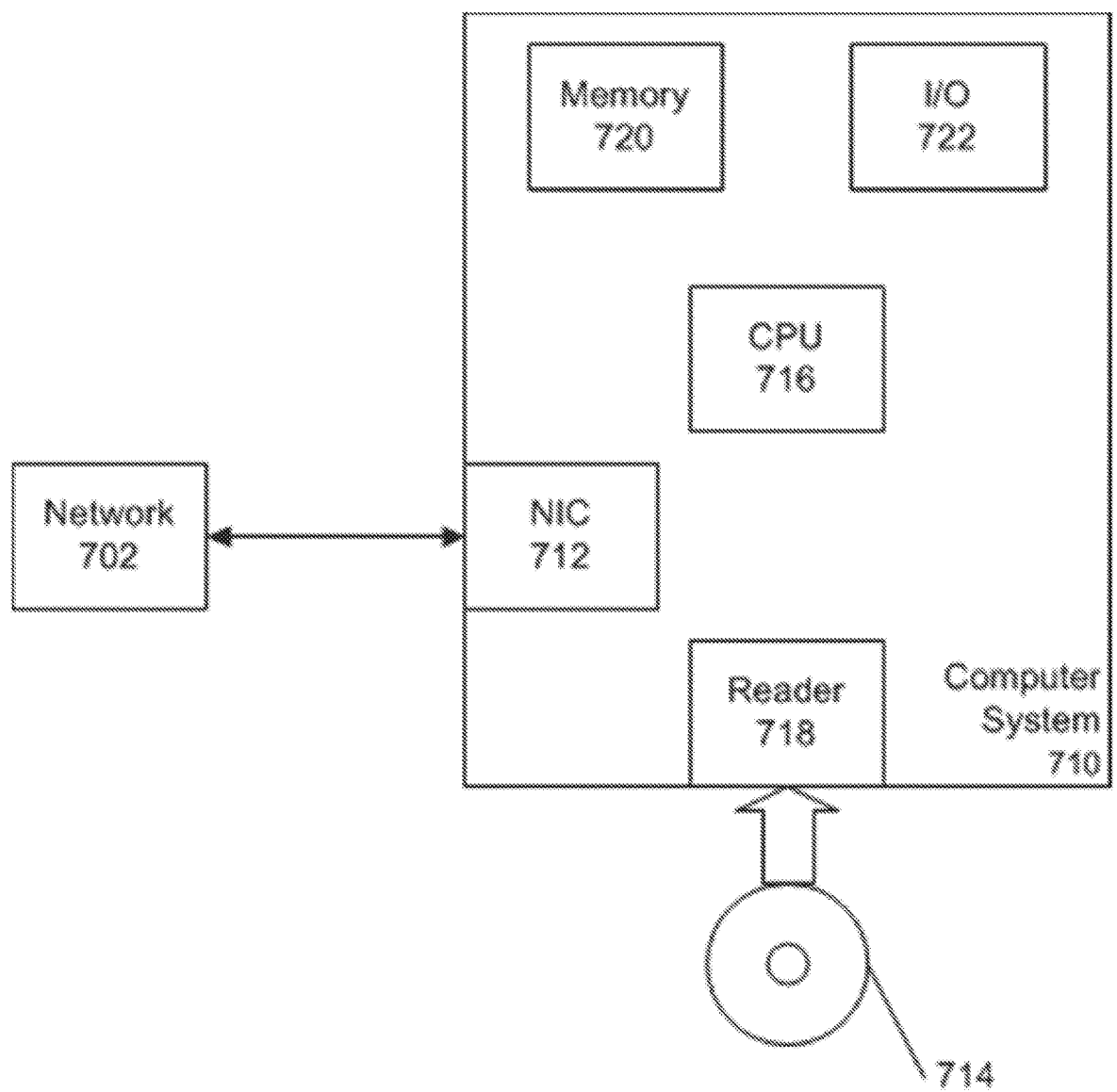
FIG. 5 illustrates a configuration for a computer system constructed in accordance with the present disclosure.

FIG. 5 illustrates a configuration for a computer system 710 constructed in accordance with the present disclosure for performing the steps described herein. The computer system 710 can comprise a system such as a personal computer or other computer or the like. The computer system 710 may include a network communication interface 712 that permits communications with a network 702. The network interface can comprise a network interface card (NIC). The computer system 710 can execute instructions to provide a computer system which performs various aspects and principles of the features described herein for the computer of FIGS. 1-4.

The computer system 710 includes a central processor unit 716 (CPU) and a program product reader 718 for receiving a program product media and reading program instructions recorded thereon, where the instructions, when executed by the CPU of the computer system cause the computer to perform various aspects and principles and features described herein. The computer system also includes associated memory 720 and input/output facilities 722, which may include systems such as a display for output and a keyboard and/or mouse for input. The processor 716 of the computer system 710 can receive program instructions into the program memory of the processor. The program instructions can be received directly, such as by flashing EEPROM of the processor, or can be received through the network interface 712, such as by download from a connected device or over a WAN or LAN network communication. If desired, the program instructions can be stored on a computer program product 714 that is read by the computer system 710 so that the program instructions can thereafter be executed. That is, the program product 714 is for use in a system such as the computer system 710, wherein the program product comprises a tangible, non-transitory recordable media containing a program of computer-readable instructions that are executable by the CPU 716 to perform the steps described herein. The program product 714 can comprise, for example, optical program media such as CD or DVD data discs, or flash memory drives, or external memory stores, or floppy magnetic disks, and the like.

As understood by those of skill in the art, in some embodiments, the compiler performing the functions and process elements described herein may be generated by writing source code in a high level language describing the functionality of the compiler to be generated.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A compiler configured to generate executable code based on source code for execution on a processor having a plurality of registers of a group of register types, wherein each register of a first register type has a first number of read and write ports, and each register of a second register type has a second number of read and write ports less than the first number of read and write ports, wherein the source code comprises a plurality of variables each having a respective usage in context of a programming loop of the source code,
the compiler comprising an executable code generator configured automatically to allocate one of the plurality of registers to each of the source code variables,
wherein the executable code generator is configured to select one of a group of register types to be allocated for each variable, by: selecting the first register type to be allocated for a first variable of the plurality of variables based on the first variable having a respective usage previously associated with the first register type; selecting the second register type to be allocated for a second variable of the plurality of variables based on the second variable having a respective usage previously associated with the second register type; and selecting the second register type to be allocated for a third variable of the plurality of variables based on the third variable having a respective usage previously associated with the first register type but determined to be supportable by the second number of read and write ports of the second register type, and
wherein the allocated register of each variable corresponds with the determined register type determined therefor.

2. The compiler of claim 1, wherein the group of register types comprises:
a set of general purpose registers grouped as a first register file, and
a set of specialized registers grouped as a second register file.

3. The compiler of claim 1, wherein the executable code generator is configured to select the register type to be allocated for each variable by determining how many read and write ports the register allocated to each variable will need when executed.

4. The compiler of claim 1, wherein the executable code generator is configured to select the register type to be allocated for each variable by determining which of the register types accommodate execution time needs for each variable.

5. The compiler of claim 1, wherein the executable code generator is configured to receive intermediate code generated by the compiler, wherein selecting the register type to be allocated for each variable comprises determining how the variable is used in the intermediate code.

6. The compiler of claim 5, wherein the executable code generator is configured to select the register type to be allocated for each variable by determining which of the register types accommodate execution time needs for each variable.

7. The compiler of claim 6, wherein the executable code generator is configured to select the register type to be allocated for a particular variable by determining that more than one register type accommodates the execution time needs of the particular variable.

8. The compiler of claim 7, wherein the executable code generator is configured to select the register type to be allocated for a particular variable by selecting one of the register types that accommodate the execution time needs of the particular variable based on the selected register type requiring less power to operate than other register types that accommodate the execution time needs of the particular variable.

9. The compiler of claim 7, wherein the executable code generator is configured to select the register type to be allocated for a particular variable by selecting one of the register types that accommodate the execution time needs of the particular variable based on preserving an unused state of a register file having registers of one of the register types that accommodate the execution time needs of the particular variable.

10. The compiler of claim 1, wherein the executable code generator is further configured to allocate registers of a first register type to variables determined for the first register type as a first register allocation problem, and to allocate registers of a second register type to variables determined for the second register type as a second register allocation problem.

11. A method of using a compiler to generate executable code based on source code for execution on a processor having a plurality of registers of a group of register types, wherein the source code comprises a plurality of variables each having a respective usage in context of a programming loop of the source code, the method comprising:
  with an executable code generator, selecting one of the group of register types to be allocated for each variable, wherein each register of a first register type has a first number of read and write ports, and each register of a second register type has a second number of read and write ports smaller than the first number of read and write ports, the selecting comprising:
  selecting the first register type to be allocated for a first variable of the plurality of variables based on the first variable having a respective usage previously associated with the first register type;
  selecting the second register type to be allocated for a second variable of the plurality of variables based on the second variable having a respective usage previously associated with the second register type; and
  selecting the second register type to be allocated for a third variable of the plurality of variables based on the third variable having a respective usage previously associated with the first register type but determined to be supportable by the second number of read and write ports of the second register type; and
  with the executable code generator, automatically allocating one of the plurality of registers to each of the source code variables, wherein the allocated register of each variable corresponds with the determined register type determined therefor.

12. The method of claim 11, wherein the group of register types comprises:
  a set of general purpose registers grouped as a first register file, and
  a set of specialized registers grouped as a second register file.

13. The method of claim 11, wherein selecting the register type to be allocated for each variable comprises determining how many read and write ports the register allocated to each variable will need when executed.

14. The method of claim 11, wherein selecting the register type to be allocated for each variable comprises determining which of the register types accommodate execution time needs for each variable.

15. The method of claim 11, further comprising, with the executable code generator, receiving intermediate code generated by the compiler, wherein selecting the register type to be allocated for each variable comprises determining how the variable is used in the intermediate code.

16. The method of claim 15, wherein selecting the register type to be allocated for each variable comprises determining which of the register types accommodate execution time needs for each variable.

17. The method of claim 16, wherein selecting the register type to be allocated for a particular variable comprises determining that more than one register type accommodates the execution time needs of the particular variable.

18. The method of claim 17, wherein selecting the register type to be allocated for a particular variable comprises selecting one of the register types that accommodate the execution time needs of the particular variable based on the selected register type requiring less power to operate than other register types that accommodate the execution time needs of the particular variable.

19. The method of claim 17, wherein selecting the register type to be allocated for a particular variable comprises selecting one of the register types that accommodate the execution time needs of the particular variable based on preserving an unused state of a register file having registers of one of the register types that accommodate the execution time needs of the particular variable.

20. The method of claim 11, further comprising, with the executable code generator, allocating allocate registers of a first register type to variables determined for the first register type as a first register allocation problem, and allocating registers of a second register type to variables determined for the second register type as a second register allocation problem.

* * * * *